US007274392B2

United States Patent
Wakabayashi et al.

(10) Patent No.: US 7,274,392 B2
(45) Date of Patent: Sep. 25, 2007

(54) ELECTRONIC CAMERA THAT SETS AN UPPER LIMIT OF AN EXPOSURE TIME DURING DARK IMAGE CAPTURE

(75) Inventors: Tsutomu Wakabayashi, Yokohama (JP); Naoisa Nomura, Yokohama (JP)

(73) Assignees: Nikon Corporation, Tokyo (JP); Nikon Systems Inc., Yokohama (JP)

( * ) Notice: Subject to any disclaimer, the term of this patent is extended or adjusted under 35 U.S.C. 154(b) by 744 days.

(21) Appl. No.: 10/351,548

(22) Filed: Jan. 27, 2003

(65) Prior Publication Data

US 2004/0036776 A1    Feb. 26, 2004

(30) Foreign Application Priority Data

Jan. 28, 2002    (JP)    ............................. 2002-018664

(51) Int. Cl.
  *H04N 9/64*    (2006.01)
(52) U.S. Cl. ........................ 348/243; 348/241; 348/244
(58) Field of Classification Search .................... None
  See application file for complete search history.

(56) References Cited

U.S. PATENT DOCUMENTS 5,729,288 A    3/1998    Saito 6,798,456 B1*    9/2004    Sato ............................. 348/362
2002/0012053 A1*    1/2002    Yoshida ....................... 348/243

FOREIGN PATENT DOCUMENTS

JP    2000-125204    4/2000

\* cited by examiner

*Primary Examiner*—Lin Ye
*Assistant Examiner*—Anthony J. Daniels
(74) *Attorney, Agent, or Firm*—Oliff & Berridge, PLC

(57) ABSTRACT

An electronic camera according to the present invention includes: an image-capturing element that outputs image-capturing signals; a shutter device that allows subject light pass through to the image-capturing element or shields the image-capturing element from the subject light; an image-capturing circuit that engages the image-capturing element in an image-capturing operations over a predetermined length of time to output to a first image-capturing signal while the subject light is allowed to pass through to the image-capturing element and also engages the image-capturing element in an image-capturing operation over a predetermined length of time while the image-capturing element is shielded from the subject light; a signal correction circuit that executes a signal correction by subtracting the second image-capturing signal from the first image-capturing signal; and a control circuit that controls the image-capturing circuit so as to set an upper limit to the length of the image-capturing operation executed while the image-capturing element is shielded from the subject light.

13 Claims, 7 Drawing Sheets

US 7,274,392 B2

ELECTRONIC CAMERA THAT SETS AN UPPER LIMIT OF AN EXPOSURE TIME DURING DARK IMAGE CAPTURE

INCORPORATION BY REFERENCE

The disclosure of the following priority application is herein incorporated by reference: Japanese Patent Application No. 2002-018664 filed Jan. 28, 2002

BACKGROUND OF THE INVENTION

1. Field of the Invention

The present invention relates to an electronic camera that captures a subject image by employing an image-capturing element.

2. Description of the Related Art

At an image-capturing element such as a CCD, electrical charges are accumulated in correspondence to the intensity of the incident subject light. However, electrical charges are also accumulated due to dark current flowing to the light-receiving elements constituting the pixels even when there is no light entering the element. Since there is inconsistency in the dark current flowing to the individual light-receiving elements, the electrical charges stored due to the dark current form a nonuniform fixed pattern among the individual pixels, Such a fixed pattern limits the sensitivity and the dynamic range of the image-capturing element, U.S. Pat. No. 5,729,288 discloses a technology for eliminating the adverse effect of stored electrical charges attributable to dark current by performing a main photographing operation in which the image-capturing element is exposed to the subject light and the resulting electrical charges are stored, as well as a shielded photographing operation in which electrical charges are stored over a length of time matching the length of the main photographing operation while the image-capturing element is shielded from the subject light. The data obtained through the shielded photographing operation is then subtracted from the data resulting from the main photographing operation.

In this technology in the related art, if the main photographing operation is executed over an extended exposure period, the shielded photographing operation needs to be performed over an equally long period of time. When the shielded photographing operation is executed over an extended period of time, electrical charges exceeding the charge storage capacity of the image-capturing element may accumulate due to the dark current, resulting in a charge overflow. In such a situation, the advantage of subtracting the shielded photographing operation data from the main photographing operation data is lost. Furthermore, the time spent executing the shielded photographing operation is wasted.

SUMMARY OF THE INVENTION

The present invention provides an electronic camera that sets a limit to the length of time over which it is allowed to engage in an image-capturing operation in a shielded state.

An electronic camera according to the present invention comprises: an image-capturing element that outputs image-capturing signals; a shutter device that allows subject light pass through to the image-capturing element or shields the image-capturing element from the subject light; an image-capturing circuit that engages the image-capturing element in an image-capturing operations over a predetermined length of time to output to a first image-capturing signal while the subject light is allowed to pass through to the image-capturing element and also engages the image-capturing element in an image-capturing operation over a predetermined length of time while the image-capturing element is shielded from the subject light; a signal correction circuit that executes a signal correction by subtracting the second image-capturing signal from the first image-capturing signal; and a control circuit that controls the image-capturing circuit so as to set an upper limit to the length of the image-capturing operation executed while the image-capturing element is shielded from the subject light.

In this electronic camera, it is preferred that the control circuit determines the upper limit based upon characteristics of the image-capturing element.

Also, it is preferred that the control circuit determines the upper limit so that the second image-capturing signal output from the image-capturing element does not exceed an output saturation level of the image-capturing element.

Also, it is preferred that the control circuit determines the upper limit based upon image-capturing sensitivity of the image-capturing element.

Also, it is preferred that a temperature detection element that detects a temperature inside the camera is further provided and the control circuit determines the upper limit based upon the temperature detected by the temperature detection element.

Also, it is preferred that a temperature detection element that detects a temperature inside the camera is further provided and the control circuit determines the upper limit based upon the temperature detected by the temperature detection element and image-capturing sensitivity of the image-capturing element.

Also, it is preferred that a temperature detection element that detects a temperature inside the camera is further provided and the control circuit determines the upper limit by using a function in which at least either the temperature detected by the temperature detection element or image-capturing sensitivity of the image-capturing element is a variable.

Also, it is preferred that the control circuit determines the upper limit based upon at least either a setting range of image-capturing sensitivity of the image-capturing element or an operating temperature range of the camera.

Also, it is preferred that a temperature detection element that detects a temperature inside the camera is further provided, and the control circuit determines the upper limit by using a function of the temperature detected by the temperature detection element and sets the function at an image-capturing sensitivity level within a setting range of image-capturing sensitivity of the image-capturing element, at which a dark current is at a highest level.

Also, it is preferred that the control circuit determines the upper limit by using a function of image-capturing sensitivity of the image-capturing element and sets the function at an operating temperature level within an operating temperature range of the electronic camera, at which a dark current is at a highest level.

Also, it is preferred that the signal correction circuit executes the signal correction by subtracting the second image-capturing signal from the first image-capturing signal for each of pixels constituting the image-capturing element.

DESCRIPTION OF THE PREFERRED EMBODIMENT

The following is an explanation of an embodiment of the present invention, given in reference to the drawings.

Figure 1:
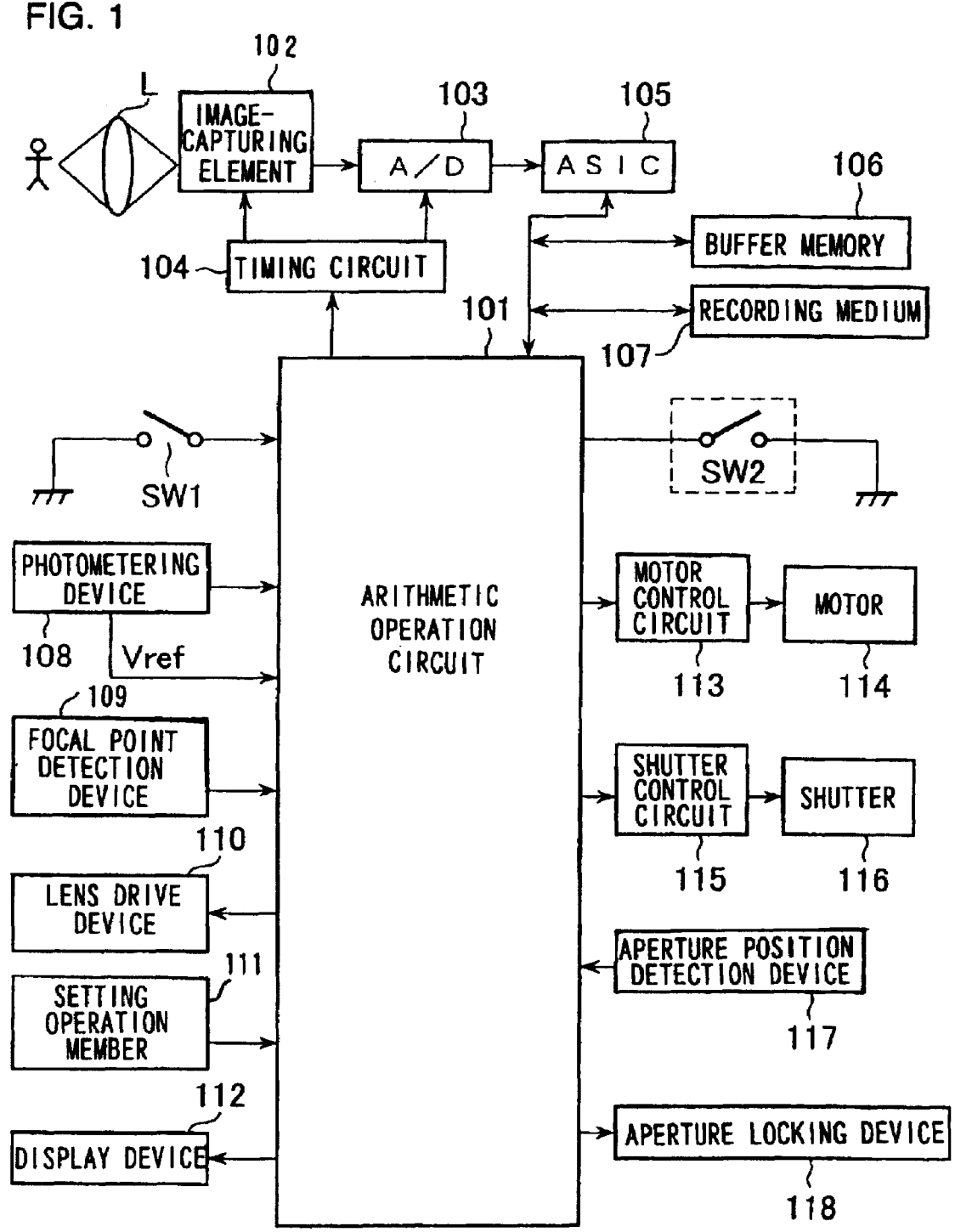
FIG. 1 is a block diagram illustrating the structure of an electronic camera achieved in an embodiment of the present invention.

FIG. 1 is a block diagram illustrating the structure of an electronic camera achieved in the embodiment of the present invention. An arithmetic operation circuit 101 in FIG. 1 is constituted of a microcomputer or the like. The arithmetic operation circuit 101 executes specific arithmetic operations by using signals input from the various blocks which are to be detailed later and outputs control signals to the individual blocks based upon the results of the arithmetic operation. An image-capturing element 102 is constituted of a CCD or the like. The image-capturing element 102 captures an image formed with subject light having passed through a photographic lens L and outputs image-capturing signals to an A/D conversion circuit 103. The A/D conversion circuit 103 converts the analog image-capturing signals to digital signals. The image-capturing element 102 and the A/D conversion circuit 103 are driven with predetermined operational timing by a drive signal output from a timing circuit 104.

An image processing circuit 105 is constituted of an ASIC or the like. In addition to executing image processing such as white balance processing on image data resulting from the digitization, the image processing circuit 105 executes compression processing for compressing the image data having undergone the image processing into a predetermined format. decompression processing for decompressing compressed image data and the like.

Image data that are processed at the image processing circuit 105 are temporarily stored into a buffer memory 106. In addition, original image data and fixed image data to be used for noise removal during which the fixed image data obtained by capturing an image with a shutter 116 to be detailed later in a closed state are subtracted from the original image data obtained by capturing an image with the shutter 116 in an open state are also temporarily stored into the buffer memory 106. The image captured while the shutter 116 is closed is formed by electrical charges stored due to dark current which manifest inconsistency among the light-receiving elements constituting the pixels of the image-capturing element, and this image is referred to as a fixed image, since a nonuniform fixed pattern manifests among the individual image-capturing elements.

A recording medium 107 is constituted of a memory card or the like that can be loaded into/unloaded from the camera, Image data having undergone the image processing are recorded into the recording medium 107. A shutter release SW1, which interlocks with a shutter release operation button (not shown), outputs a release operation signal to the arithmetic operation circuit 101.

A photometering device 108 detects the subject brightness and outputs a detection signal to the arithmetic operation circuit 101. The photometering device 108, which is constituted of an IC having a photoelectric conversion element, also outputs a voltage signal Vref that is in proportion to the absolute temperature in addition to the brightness detection signal. By using the voltage value indicated by the voltage signal Vref for substitution in a formula (1) below, the arithmetic operation circuit 101 calculates the temperature θ (unit: degree C.) of the photometering device 108 within the camera.

$$\theta = (Vref/V0) \times 298 - 273 \quad (1)$$

with V0 representing the reference voltage at 25 degrees C., which is stored in memory at the arithmetic operation circuit 101 in advance.

A focal point detection device 109 detects the state of the focusing position adjustment achieved by the photographic lens L and outputs a detection signal to the arithmetic operation circuit 101. A lens drive device 110 drives a focus lens (not shown) of the photographic lens L to advance or retreat along the optical axis in response to a command issued by the arithmetic operation circuit 101, so as to adjust the focusing position of the photographic lens L.

A setting operation member 111, which is constituted of switches operated to select settings of the electronic camera, outputs an operation signal corresponding to a specific setting operation to the arithmetic operation circuit 101. Setting operations include an operation performed to set whether or not noise removal processing is to be executed, an operation performed to set the shutter speed, an operation performed to set the aperture value and an operation performed to set the image-capturing sensitivity. At a display device 112, photographing information including the shutter speed and the aperture value, exposure information indicating whether or not correct exposure is achieved and information indicating whether or not the noise removal processing is to be executed are displayed.

A motor control circuit 113 executes drive control on a sequence motor 114 in response to a command issued by the arithmetic operation circuit 101. The sequence motor 114, which constitutes a sequence drive device (not shown), raises/lowers a mirror (not shown), drives an aperture (not shown), charges the shutter 116 and the like. A sequence switch SW2, which also constitutes the sequence drive device mentioned above, generates braking control timing and the like for the sequence motor 114.

A shutter control circuit 115 individually implements hold/release control on the front curtain and the rear curtain (not shown) at the shutter 116. An aperture position detection device 117 detects the aperture position which corresponds to the aperture value and outputs a detection signal to the arithmetic operation circuit 110. An aperture locking device 118 locks the aperture while it is being driven and stops the aperture at a specific aperture value.

The present invention is characterized in that when noise is removed by subtracting a signal constituting the fixed image data from a signal constituting the original image data, i.e., when a signal correction is executed, in the electronic camera described above, an upper limit is set to the length of time over which the image-capturing operation is performed to obtain the fixed image data.

Figure 2:
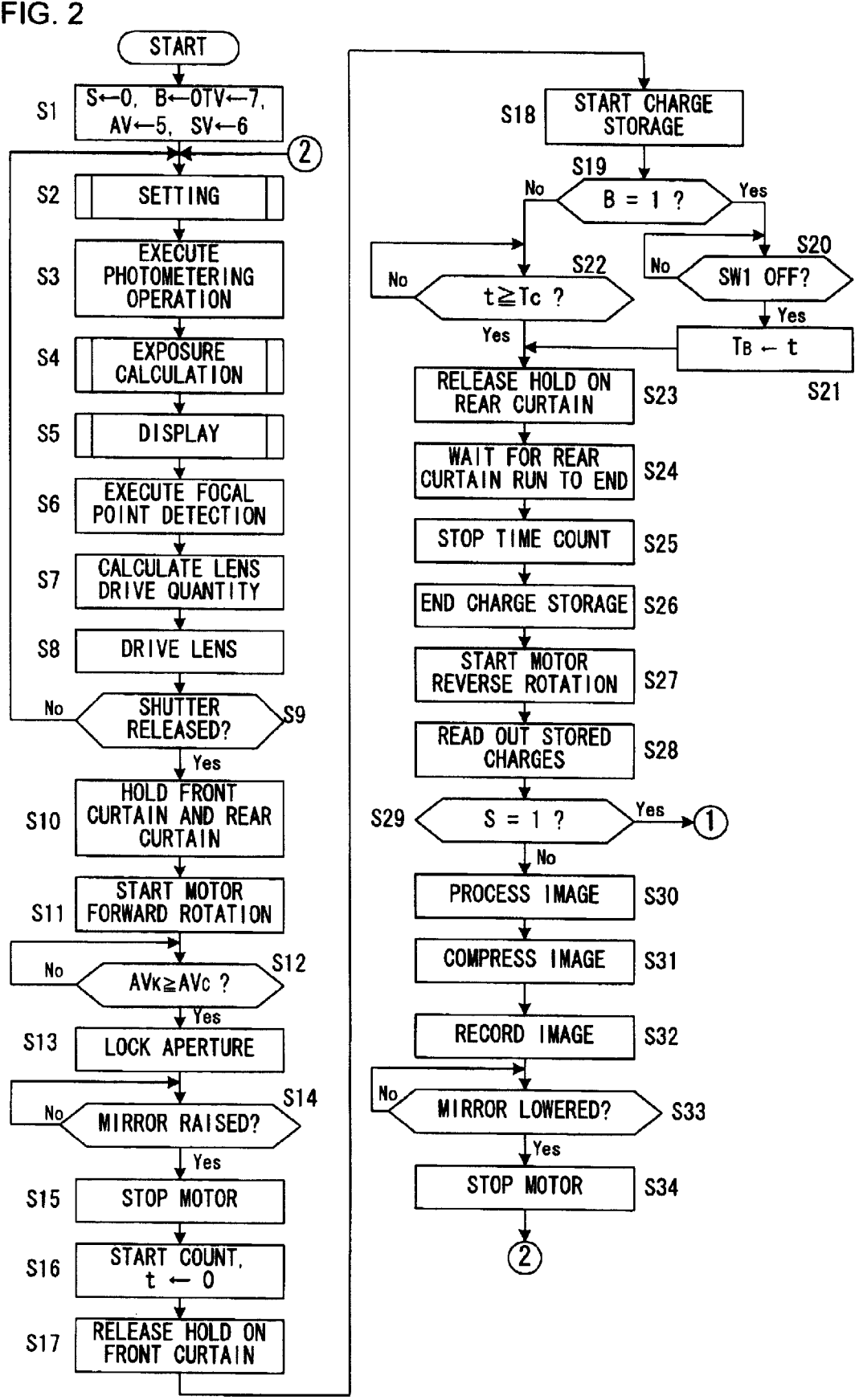
FIG. 2 presents a flowchart of the processing executed in the arithmetic operation circuit of the camera.
Figure 3:
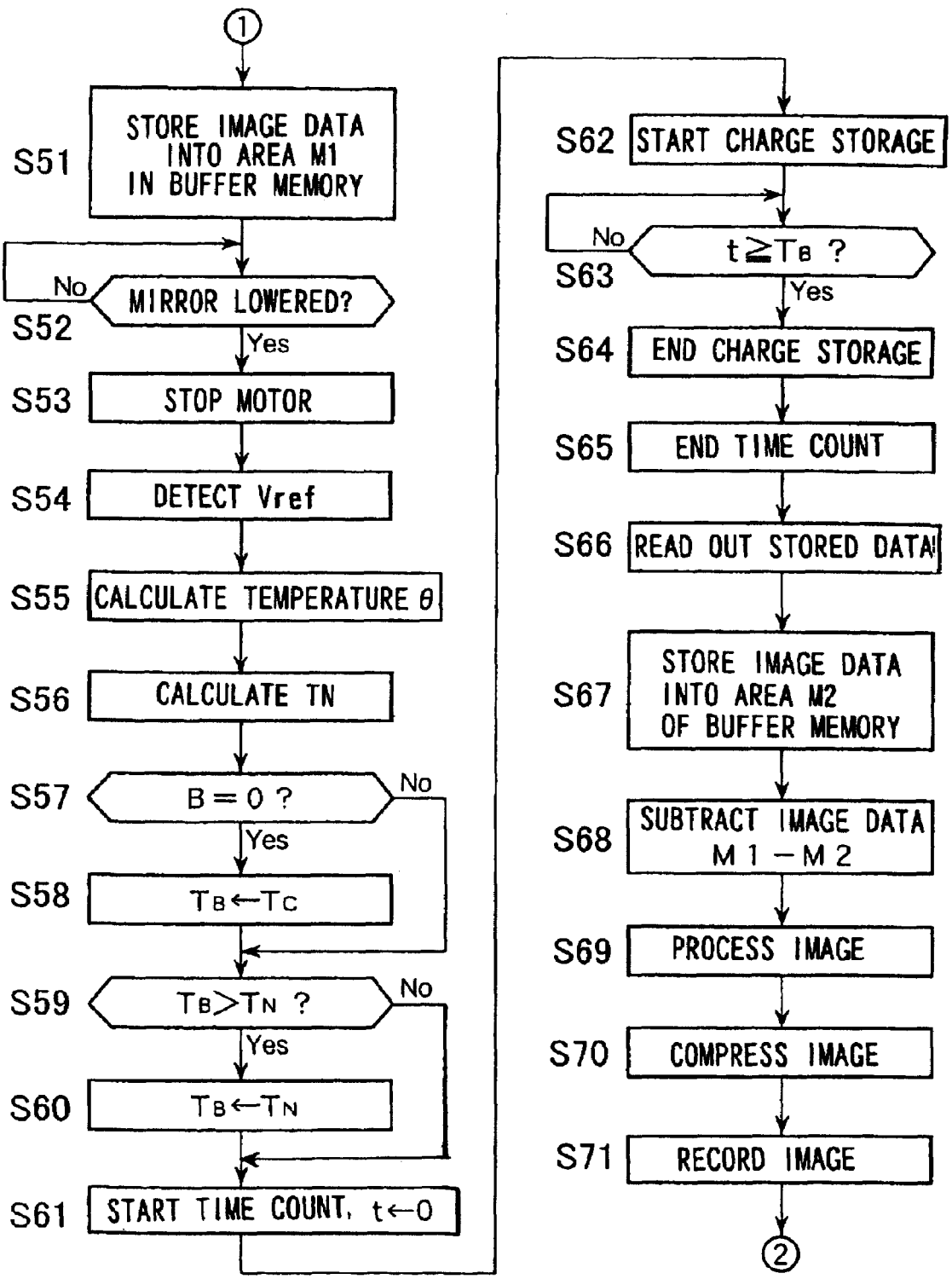
FIG. 3 presents a flowchart of the processing executed in the arithmetic operation circuit of the camera.

The camera operation processing executed at the arithmetic operation circuit 101 of the electronic camera is now explained in reference to the flowchart presented in FIGS. 2 and 3. The program that enables the processing in the flowchart presented in FIGS. 2 and 3 is started up as batteries (not shown) are loaded into the electronic camera. After the arithmetic operation circuit 101 performs an initial reset by setting a flag S to 0, a flag B to 0, a shutter speed TV to 7, an aperture value AV to 5 and image-capturing sensitivity SV to 6 in step S1 in FIG. 2, the operation proceeds to step S2. The flag S is set to 1 when the noise removal setting is selected to remove noise and is set to 0 when the noise removal setting is cleared. The flag B is set to 1 when the shutter speed is set lower than 1 sec through bulb setting and is set to 0 when the shutter speed is not selected with bulb setting.

The APEX values are used for the shutter speed TV, the aperture value AV and the image-capturing sensitivity SV. The setting range for the shutter speed of the camera achieved in the embodiment is TV0 (1 sec) through TV 10 (1/1000 sec), The setting range for the aperture value of the camera in the embodiment is AV 3 (F 2.8) through AV 9 (F 22). The setting range for the image-capturing sensitivity of the camera in the embodiment is SV 6 (equivalent to ISO 200) through SV 9 (equivalent to ISO 1600).

In step S2, the arithmetic operation circuit 101 executes setting processing in conformance to the operation signal input through the setting operation member 111, and then the operation proceeds to step S3. In the setting processing, the indicating whether or not the noise removal processing is to be executed is selected, the shutter speed TV is set, the aperture value AV is set, the image-capturing sensitivity SV is set and the like. The setting processing is to be described in detail later.

In step S3, the arithmetic operation circuit 101 executes a photometering operation to calculate the subject brightness BV by using the detection signal input from the photometering device 108, and then the operation proceeds to step S4. In step S4, the arithmetic operation circuit 101 executes exposure calculation processing before the operation proceeds to step S5. The exposure calculation processing is to be described in detail later. In step S5, the arithmetic operation circuit 101 executes display processing to display the information indicating whether or not correct exposure has been achieved based upon the results of the exposure calculation, the shutter speed TV, the aperture value AV, the image-capturing sensitivity SV and the information indicating whether or not the noise removal function processing is to be executed at the display device 112, and then the operation proceeds to step S6. The display processing is to be described in detail later.

In step S6, the arithmetic operation circuit 101 outputs a command for the focal point detection device 109 to detect the state of the focusing position adjustment by the photographic lens L, before the operation proceeds to step S7. In step S7, the arithmetic operation circuit 101 calculates the focus lens drive quantity based upon the results of the detection executed by the focal point detection device 109, and then the operation proceeds to step S8. In step S8, the arithmetic operation circuit 101 outputs a command for the lens drive device 110 to drive the focus lens to the focus-matching position before the operation proceeds to step S9.

In step S9, the arithmetic operation circuit 101 makes a decision as to whether or not the shutter release switch SW1 has been operated. If an operation signal has been input from the shutter release rich SW1, the arithmetic operation circuit 101 makes an affirmative decision in step S9 to proceed to step S10, whereas if no operation signal has been input from the shutter release switch SW1, the arithmetic operation circuit 101 makes a negative decision in step S9 and, in this case, the operation returns to step S2.

In step S10, the arithmetic operation circuit 101 outputs a command for the shutter control circuit 115 to supply electrical power to magnets (not shown) at the shutter 116 to hold both the front curtain and the rear curtain. In step S11, the arithmetic operation circuit 101 outputs a command for the motor control circuit 113 to start a forward rotation of the sequence motor 114 before the operation proceeds to step S12. As a result, the mirror (not shown) starts to move upward and also, an aperture setting operation for the aperture starts. In step S12, the arithmetic operation circuit 101 determines a drive aperture value AVk by using the detection signal input from the aperture position detection device 117 and makes a decision as to whether or not the drive aperture value AVk and a control aperture value AVc achieve a relationship expressed as AVk>=AVc. The control aperture value AVc has been obtained through the exposure calculation processing in step S4. The arithmetic operation circuit 101 makes an affirmative decision in step S12 if the relationship AVk>=AVc is achieved to proceed to step S13, whereas it makes a negative decision in step S12 if the relationship AVk>=AVc is not achieved. If a negative decision is made in this situation, the aperture setting operation is continuously performed and the decision-making processing in step S12 is repeatedly executed.

In step S13, the arithmetic operation circuit 101 outputs a command for the aperture locking device 118 to lock the aperture and then the operation proceeds to step S14. In step S14, the arithmetic operation circuit 101 makes a decision as to whether or not the mirror-up operation has been completed. The arithmetic operation circuit 101 makes an affirmative decision in step S14 if an ON signal has been input from the sequence switch SW2 to proceed to step S15, whereas it makes a negative decision in step S14 if no ON signal has been input from the sequence switch SW2. If a negative decision is made in this situation, the mirror-up operation is continuously performed and the decision-making processing in step S14 is repeatedly executed.

In step S15, the arithmetic operation circuit 101 outputs a command for the motor control circuit 113 to stop the forward rotation of the sequence motor 114 and then the operation proceeds to step S16. It is to be noted that the sequence drive device (not shown) is structured so that the aperture is completely locked by the aperture locking device 118 before the mirror-up operation is completed. In step S16, the arithmetic operation circuit 101 starts a count of a time length t before the operation proceeds to step S17. The initial value of t is 0.

In step S17, the arithmetic operation circuit 101 outputs a command for the shutter control circuit 115 to stop the electrical power supply to the magnet (not shown) at the shutter 116 so as to release the hold on the front curtain, and then the operation proceeds to step S18. As a result, the shutter front curtain starts its run. In step S18, the arithmetic operation circuit 101 prompts the timing circuit 104 to start generating a drive signal, thereby starting drive of the image-capturing element 102, and then the operation proceeds to step S19. Thus, an electrical charge storage starts at the image-capturing element 102 in correspondence to the intensity of the subject light entering the image-capturing surface.

In step S19, the arithmetic operation circuit 101 makes a decision as to whether or not the flag B is set to 1. If the flag B is set to 1, the arithmetic operation circuit 101 makes an affirmative decision in step S19 and the operation proceeds to step S20. If the flag B is set to 1, the shutter speed has been selected with bulb setting. If, on the other hand, the flag B is set to 0, the arithmetic operation circuit makes a negative decision in step S19 and the operation proceeds to step S22. If the flag B is set to 0, the shutter speed has not been selected with bulb setting.

In step S20, the arithmetic operation circuit 101 makes a decision as to whether or not the shutter release switch SW1 has been turned off. If an operation signal input from the shutter release switch SW1 has been cleared, the arithmetic operation circuit 101 makes an affirmative decision in step S20 and the operation proceeds to step S21, whereas if an operation signal is currently input from the shutter release switch SW1, the arithmetic operation circuit 101 makes a negative decision in step S20 to repeatedly execute the decision-making processing. Thus, the shutter rear curtain is not released until the depression of the shutter release button is released. In step S21, the arithmetic operation circuit 101 sets the time count t for the image-capturing time period TB before the operation proceeds to step S23. The image-capturing time period TB in this situation is the bulb photographing period.

In step S22, the arithmetic operation circuit 101 makes a decision as to whether or not the time count t and a control shutter speed time period TB achieve a relationship expressed as t>=Tc. The control shutter speed time period Tc has been obtained through the exposure calculation processing executed in step S4. The arithmetic operation circuit 101 makes an affirmative decision in step S22 if the relationship t>=Tc is achieved to proceed to step S23, whereas it makes a negative decision in step S22 if the relationship t>=Tc is not achieved to repeatedly execute the decision-making processing. In step S23, the arithmetic operation circuit 101 outputs a command for the shutter control circuit 115 to stop the electrical power supply to the magnet (not shown) at the shutter 116 to release the hold on the rear curtain and then the operation proceeds to step S24. As a result, the shutter rear curtain starts its run and the subject light which would otherwise enter the image-capturing element 102 is blocked.

In step S24, the arithmetic operation circuit 101 waits in standby over a predetermined length of time before the operation proceeds to step S25. The length of this wait period is set to the length of time required by the rear curtain to completely shield the image-capturing area at the image-capturing element 102 and complete its run. During this wait period, the image-capturing operation is continuously performed at the image-capturing element 102. In step S25, the arithmetic operation circuit 101 stops the count of the time length t, and then the operation proceeds to step S26. In step S26, the arithmetic operation circuit 101 stops the drive of the image-capturing element 102 by the timing circuit 104 before the operation proceeds to step S27. Thus, the charge storage operation at the image-capturing element 102 ends.

In step S27, the arithmetic operation circuit 101 outputs a command for the motor control circuit 113 to start a reverse rotation of the sequence motor 114 and then the operation proceeds to step S28. As a result, the mirror (not shown) starts to move downward and an aperture open/reset operation starts. In step S28, the arithmetic operation circuit 101 outputs a command for the timing circuit 104 to start reading out the image signals from the image-capturing element 102 before the operation proceeds to step S29. Thus, the image signals discharged from the image-capturing element 102 are converted to digital data at the A/D conversion circuit 103. These image data are referred to as original image data.

In step S29, the arithmetic operation circuit 101 makes a decision as to whether or not the flag S is set to 1. The arithmetic operation circuit 101 makes an affirmative decision in step S29 if the flag S is set to 1 to proceed to step S51 in FIG. 3. If the flag S is set to 1, the noise removal is executed If, on the other hand, the flag S is set to 0, the arithmetic operation circuit makes a negative decision in step S29 to proceed to step S30. No noise removal is executed in this case.

In step S30, the arithmetic operation circuit 101 provides the original image data to the image processing circuit 105 and issues an instruction for the image processing circuit 105 to execute image processing before the operation proceeds to step S31. In step S31, the arithmetic operation circuit 101 issues an instruction for the image processing circuit 105 to execute compression processing and then the operation proceeds to step S32. In step S32, the arithmetic operation circuit 101 records the image data having undergone the compression processing into the recording medium 107 before the operation proceeds to step S33.

In step S33, the arithmetic operation circuit 101 makes a decision as to whether or not the mirror-down operation has been completed. The arithmetic operation circuit 101 makes an affirmative decision in step S33 if an ON signal has been input from the sequence switch SW2, whereas it makes a negative decision in step S33 if no ON signal has been input from the sequence switch SW2 to repeatedly execute the decision-making processing in step S33.

In step S34, the arithmetic operation circuit 101 outputs a command for the motor control circuit 113 to stop the reverse rotation of the sequence motor 114 before the operation returns to step S2. Thus, the sequence of the photographing processing ends.

The noise removal processing is executed in step S51 and subsequent steps in FIG. 3. In step S51, the arithmetic operation circuit 101 stores the original image data into a memory area M1 of the buffer memory 106 before the operation proceeds to step S52. In step S52, the arithmetic operation circuit 101 makes a decision as to whether or not the mirror-down operation has been completed. The arithmetic operation circuit 101 makes an affirmative decision in step S52 if an ON signal has been input from the sequence switch SW2, whereas it makes a negative decision in step S52 if no ON signal has been input from the sequence switch SW2 to repeatedly execute the decision-making processing in step S52.

In step S53, the arithmetic operation circuit 101 outputs a command for the motor control circuit 113 to stop the reverse rotation of the sequence motor 114 and then the operation proceeds to step S54. In step S54, the arithmetic operation circuit 101 receives the voltage signal Vref input from the photometering device 108 and the operation proceeds to step S55. In step S55, the arithmetic operation circuit 101 calculates the temperature θ by using formula (1) presented earlier before the operation proceeds to step S56. In step S56, the arithmetic operation circuit 101 calculates a charge storage time length upper limit TN (unit: sec) at which the noise removal effect is still achieved by using formula (2) presented below which is a function using the temperature θ and the image-capturing sensitivity SV as its variables.

$$TN = 2^{(7-SV)} \times 2^{-(\theta-32)/8} \times 15 \times 60 \qquad (2)$$

The expression of formula (2) above indicates that the dark current which increases as the temperature rises is doubled as the temperature rises by 8 degrees C. and that when the image-capturing sensitivity SV is set to 7 (equivalent to ISO 400) and θ=32 degrees C., the length of time over which electrical charges attributable to dark current can be stored to the maximum extent without overflowing is 15 minutes. This charge storage time length TN is the upper limit which is set to assure the full dynamic range at the image-capturing element 102. It is to be noted that the level of signals attributable to the electrical charges stored to the maximum extent which are output from the image-capturing element 102 matches the output saturation level. The level of the dark current flowing through the image-capturing element 102 is characteristic of the particular image-capturing element, which change in correspondence to the temperature and the sensitivity level and these characteristics vary among the various image-capturing elements.

In step S57, the arithmetic operation circuit 101 makes a decision as to whether or not the flag B is set to 0. The arithmetic operation circuit 101 makes an affirmative decision in step S57 if B=0 (the shutter speed has not been selected with bulb setting) to proceed to step S58, whereas it makes a negative decision in step S57 if B=1 (the shutter speed has been selected with bulb setting) to proceed to step S59. In step S58, the arithmetic operation circuit 101 sets the control shutter speed time period Tc for the image-capturing time period TB before the operation proceeds to step S59.

In step S59, the arithmetic operation circuit 101 makes a decision as to whether or not a relationship expressed as TB>TN is achieved with regard to the image-capturing time period TB and the charge storage time length upper limit TN. If the relationship TB>TN is achieved, the arithmetic operation circuit 101 makes an affirmative decision in step S59 to proceed to step S60, whereas if the relationship TB>TN is not achieved, the arithmetic operation circuit 101 makes a negative decision in step S59 to proceed to step S61.

In step S60, the arithmetic operation circuit 101 sets the charge storage time length upper limit TN for the image-capturing time period TB and then the operation proceeds to step S61. Thus, it is ensured that the length of time over which electrical charges are to be stored to obtain the fixed image data does not exceed the charge storage time length upper limit TN. In step S61, the arithmetic operation circuit 101 starts a count of the time length t before the operation proceeds to step S62. The initial value of t is 0.

In step S62, the arithmetic operation circuit 101 prompts the timing circuit 104 to start generating a drive signal, thereby starting drive of the image-capturing element 102, and then the operation proceeds to step S63. At this time, the shutter 116 is in a charged state and the light is blocked. The image-capturing element 102 starts a charge storage operation while the subject light is blocked at the shutter 116.

In step S63, the arithmetic operation circuit 101 makes a decision as to whether or not the time count t and the image-capturing time period TB achieve a relationship expressed as t>=TB. The arithmetic operation circuit 101 makes an affirmative decision in step S63 if the relationship t>=TB is achieved to proceed to step S64, whereas it makes a negative decision in step S63 if the relationship t>=TB is not achieved to repeatedly execute the decision-making processing. In step S64, the arithmetic operation circuit 101 stops the drive of the image-capturing element 102 by the timing circuit 104 before the operation proceeds to step S65. As a result, the charge storage operation at the image-capturing element 102 ends.

In step S65, the arithmetic operation circuit 101 ends the count of the time length t before the operation proceeds to step S66. In step S66, the arithmetic operation circuit 101 outputs a command for the timing circuit 104 to start reading out the image signals from the image-capturing element 102 before the operation proceeds to step S67. Thus, the image signals discharged from the image-capturing element 102 are converted to digital data at the A/D conversion circuit 103. These image data are referred to as fixed image data.

In step S67, the arithmetic operation circuit 101 stores the fixed image data into a memory area M2 of the buffer memory 106 and then the operation proceeds to step S68. In step S68, the arithmetic operation circuit 101 subtracts the fixed image data stored in the memory area M2 from the original image data stored in the memory area M1 and thus generates image data by eliminating the fixed pattern noise, which are then stored into a member area M3 of the buffer memory 106 before the operation proceeds to step S69. It is to be noted that during the subtraction processing, the subtraction is executed for each of the pixels by subtracting fixed image data at a given pixel from the corresponding original image data at the same pixel.

In step S69, the arithmetic operation circuit 101 provides the image data obtained by removing the fixed pattern noise to the image processing circuit 105 and issues an instruction for the image processing circuit 105 to execute the image processing, before the operation proceeds to step S70. In step S70, the arithmetic operation circuit 101 issues an instruction for the image processing circuit 105 to execute the compression processing and then the operation proceeds to step S71. In step S71, the arithmetic operation circuit 101 records the image data having undergone the compression processing into the recording medium 107 and then the operation returns to step S2 in FIG. 2. Thus, the sequence of the photographing processing ends.

Figure 4:
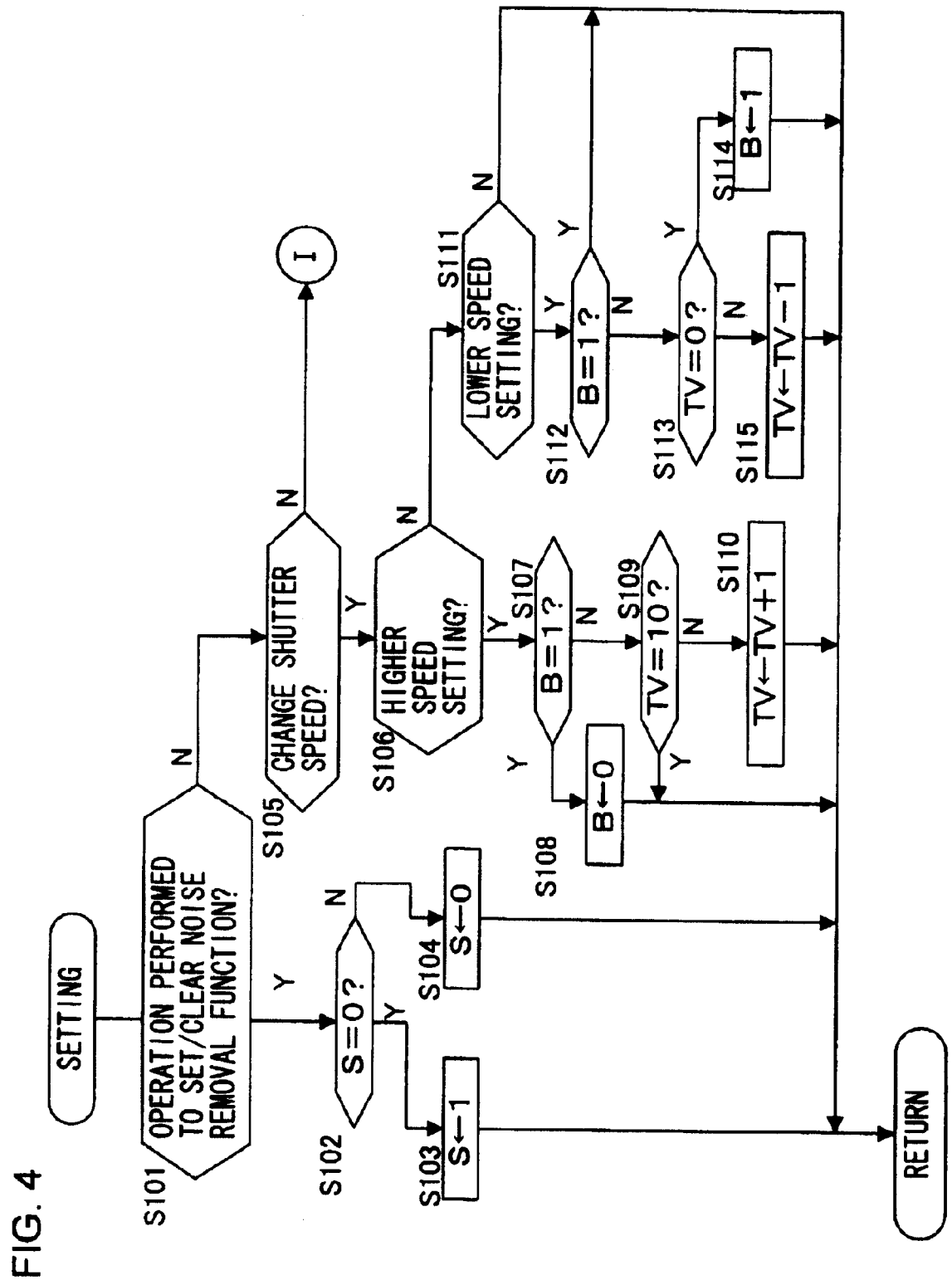
FIG. 4 presents a detailed flowchart of the setting processing.
Figure 5:
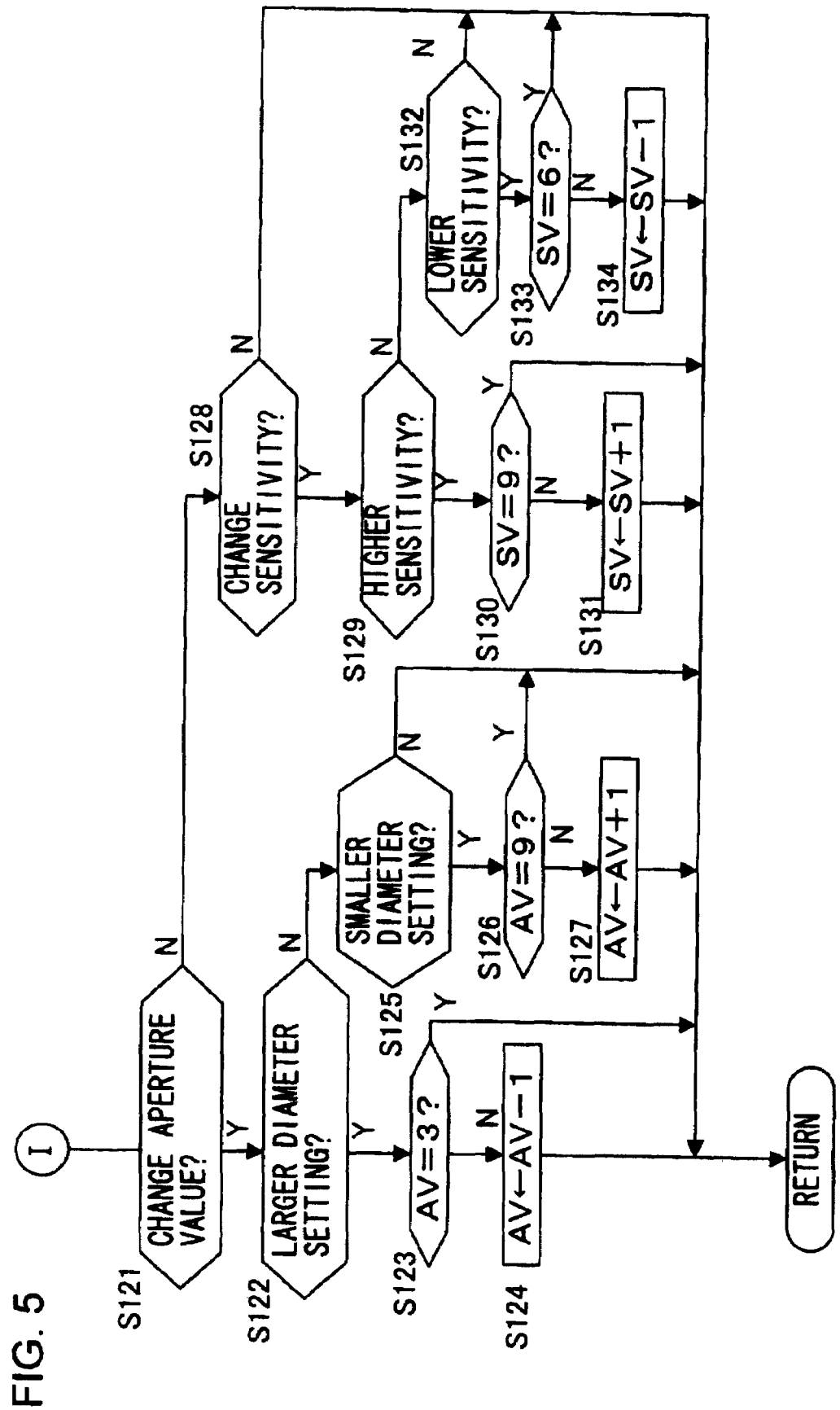
FIG. 5 presents a detailed flowchart of the setting processing.

The setting processing executed in step S2 in FIG. 2 is now explained in detail in reference to the flowchart presented in FIGS. 4 and 5. In step S101 in FIG. 4, the arithmetic operation circuit 101 makes a decision as to whether or not a setting operation has been performed. The arithmetic operation circuit 101 makes an affirmative decision in step S101 if the noise removal setting operation signal has been input from the setting operation member 111 to proceed to step S102, whereas it makes a negative decision in step S101 if no noise removal setting operation signal has been input to proceed to step S105.

In step S102, the arithmetic operation circuit 101 makes a decision as to whether or not the flag S is set to 0. The arithmetic operation circuit 101 makes an affirmative decision in step S102 if S=0 (the noise removal setting has been cleared) to proceed to step S103, whereas it makes a negative decision in step S102 if S=1 (the noise removal setting is selected) to proceed to step S104. In step S103, the arithmetic operation circuit 101 sets the flag S to 1 (selects the noise removal setting) before ending the processing shown in FIG. 4 to proceed to step S3 in FIG. 2. In step S104, the arithmetic operation circuit 101 sets the flag S to 0 (clears the noise removal setting) before ending the processing shown in FIG. 4 to proceed to step S3 in FIG. 2.

In step S105, the arithmetic operation circuit 101 makes a decision as to whether or not a shutter speed changing operation has been performed. The arithmetic operation circuit 101 makes an affirmative decision in step S105 if a shutter speed setting operation signal has been input from the setting operation member 111 to proceed to step S106. whereas it makes a negative decision in step S105 if no shutter speed setting operation signal has been input to proceed to step S121 in FIG. 5. In step S106, the arithmetic operation circuit 101 makes a decision as to whether or not the shutter speed setting operation signal indicates a higher speed setting. The arithmetic operation circuit 101 makes an affirmative decision in step S106 if the operation signal indicates a higher speed to proceed to step S107, whereas it makes a negative decision in step S106 if the operation signal does not indicate a higher speed to proceed to step S111.

In step S107, the arithmetic operation circuit 101 makes a decision as to whether or not the flag B is set to 1. If the flag B is set to 1, the arithmetic operation circuit 101 makes an affirmative decision in step S107 and the operation proceeds to step S108. If the flag B is set to 1, the shutter speed has been selected with bulb setting. If, on the other hand, the flag B is set to 0, the arithmetic operation circuit makes a negative decision in step S107 and the operation proceeds to step S109. If the flag B is set to 0, the shutter speed has not been selected with bulb setting.

In step S108, the arithmetic operation circuit 101 sets the shutter speed TV to 0 (1 sec) and also sets the flag B to 0 before the processing shown in FIG. 4 ends and the operation proceeds to step S3 in FIG. 2. In step S109, the arithmetic operation circuit 101 makes a decision as to whether or not TV=10 is true. If TV=10 (1/1000 sec), the arithmetic operation circuit 101 makes an affirmative decision in step S109 and ends the processing in FIG. 4 to proceed to step S3 in FIG. 2. In this case, the shutter speed is set to the upper limit of the setting range and, accordingly, the setting processing ends without raising the shutter speed. If, on the other hand, TV not=10, the arithmetic operation circuit 101 makes a negative decision in step S109 and the operation proceeds to step S110. In step S110, the arithmetic operation circuit 101 adds 1 to the shutter speed TV and ends the processing shown in FIG. 4 to proceed to step S3 in FIG. 2. As a result, the shutter speed is raised by 1 stage.

In step S111, the arithmetic operation circuit 101 makes a decision as to whether or not the shutter speed setting operation signal indicates a lower speed setting. The arithmetic operation circuit 101 makes an affirmative decision in step S111 if the operation signal indicates a lower speed to proceed to step S112. It makes a negative decision in step S111 if the operation signal does not indicate a lower speed and ends the processing shown in FIG. 4 to proceed to step S3 in FIG. 2.

In step S112, the arithmetic operation circuit 101 makes a decision as to whether or not the flag B is set to 1. The arithmetic operation circuit 101 makes a negative decision in step S112 if the flag B is set to 0 to proceed to step S113. In such a case, the shutter speed has not been selected with bulb setting. If, on the other hand, the flag B is set to 1, the arithmetic operation circuit makes an affirmative decision in step S112 and ends the processing shown in FIG. 4 to proceed to step S3 in FIG. 2. Since the shutter speed, which has been selected with bulb setting cannot be lowered under these circumstances, the setting processing ends.

In step S113, the arithmetic operation circuit 101 makes a decision as to whether or not TV=0 is true. The arithmetic operation circuit 101 makes an affirmative decision in step S113 if TV=0 (1 sec) to proceed to step S114, whereas it makes a negative decision in step S113 if TV not=0 to proceed to step S115. In step S114, the arithmetic operation circuit 101 selects the shutter speed with bulb setting and also sets the flag B to 1, before the processing shown in FIG. 4 ends and the operation proceeds to step S3 in FIG. 2. In step S115, the arithmetic operation circuit 101 subtracts 1 from the shutter speed TV and ends the processing shown in FIG. 4 to proceed to step S3 in FIG. 2. As a result, the shutter speed is lowered by one stage.

In step S121, the arithmetic operation circuit 101 makes a decision as to whether or not an aperture value changing operation has been performed. If an aperture value setting operation signal has been input from the setting operation member 111, the arithmetic operation circuit 101 makes an affirmative decision in step S121 to proceed to step S122, whereas if no aperture value setting operation signal has been input from the setting operation member 111, the arithmetic operation circuit 101 makes a negative decision in step S121 to proceed to step S128.

In step S122, the arithmetic operation circuit 101 makes a decision as to whether or not the aperture value setting operation signal indicates a larger aperture diameter setting. The arithmetic operation circuit 101 makes an affirmative decision in step S122 if the operation signal from the setting operation member 111 indicates the direction along which the aperture is further opened to proceed to step S123. The arithmetic operation circuit 101 makes a negative decision in step S122 if the operation signal does not indicate the aperture opening direction and in this case, the operation proceeds to step S125.

In step S123, the arithmetic operation circuit 101 makes a decision as to whether or not AV=3 is true. The arithmetic operation circuit 101 makes an affirmative decision in step S123 if AV=3 (the aperture value is set to F 2.8) and ends the processing shown in FIG. 5 to proceed to step S3 in FIG. 2. Since the aperture value is set to the lower limit of the setting range under these circumstances, the setting processing ends without further opening the aperture. If, on the other hand, AV not=3, the arithmetic operation circuit 101 makes a negative decision in step S123 to proceed to step S124. In step S124, the arithmetic operation circuit 101 subtracts 1 from the aperture value AV and ends the processing shown in FIG. 5 to proceed to step S3 in FIG. 2. As a result, the aperture value is lowered by one stage.

In step S125, the arithmetic operation circuit 101 makes a decision as to whether or not the aperture value setting operation signal indicates a smaller aperture diameter setting. The arithmetic operation circuit 101 makes an affirmative decision in step S125 if the operation signal from the setting operation member 111 indicates the direction in which the aperture is constricted to proceed to step S126, whereas it makes a negative decision in step S125 if the operation signal does not indicate the aperture closing direction and ends the processing shown in FIG. 5 to proceed to step S3 in FIG. 2.

In step S126, the arithmetic operation circuit 101 makes a decision as to whether or not AV=9 is true. The arithmetic operation circuit 101 makes an affirmative decision in step S126 if AV=9 (the aperture value is set to F 22) and ends the processing shown in FIG. 5 to proceed to step S3 in FIG. 2. Since the aperture value is set to the upper limit of the setting range under these circumstances, the setting processing ends without further constricting the aperture. If, on the other hand, AV not=9, the arithmetic operation circuit 101 makes a negative decision in step S126 to proceed to step S127. In step S127, the arithmetic operation circuit 101 adds 1 to the aperture value AV and ends the processing shown in FIG. 5 to proceed to step S3 in FIG. 2. As a result, the aperture value is raised by one stage.

In step S128, the arithmetic operation circuit 101 makes a decision as to whether or not an image-capturing sensitivity changing operation has been performed. The arithmetic operation circuit 101 makes an affirmative decision in step S128 if a sensitivity setting operation signal has been input from the setting operation member 111 to proceed to step S129. whereas it makes a negative decision in step S128 if no sensitivity setting operation signal has been input from the setting operation member 111 and ends the processing shown in FIG. 5 to proceed to step S3 in FIG. 2. In step S129, the arithmetic operation circuit 101 makes a decision as to whether or not the sensitivity level is to be raised. The arithmetic operation circuit 101 makes an affirmative decision in step S129 if the operation signal from the setting operation member 111 indicates a higher sensitivity level to proceed to step S130, whereas it makes a negative decision in step S129 if the operation signal does not indicate a higher sensitivity level to proceed to step S132.

In step S130, the arithmetic operation circuit 101 makes a decision as to whether or not SV=9 is true. The arithmetic operation circuit 101 makes an affirmative decision in step S130 if SV=9 (the image-capturing sensitivity is equivalent to ISO 1600) and ends the processing shown in FIG. 5 to proceed to step S3 in FIG. 2. Since the sensitivity is set to the upper limit of the sensitivity setting range under these circumstances, the setting processing ends without further raising the sensitivity level. If, on the other hand, SV not=9, the arithmetic operation circuit 101 makes a negative decision in step S130 to proceed to step S131. In step S131, the arithmetic operation circuit 101 adds 1 to the image-capturing sensitivity SV and ends the processing shown in FIG. 5 to proceed to step S3 in FIG. 2. As a result, the image-capturing sensitivity is raised by one stage.

In step S132, the arithmetic operation circuit 101 makes a decision as to whether or not the sensitivity level is to be lowered. The arithmetic operation circuit 101 makes an affirmative decision in step S132 if the operation signal from the setting operation member 111 indicates a lower sensitivity level to proceed to step S133, whereas it makes a negative decision in step S132 if the operation signal does not indicate a lowered sensitivity level and ends the processing shown in FIG. 5 to proceed to step S3 in FIG. 2.

In step S133, the arithmetic operation circuit 101 makes a decision as to whether or not SV=6 is true. The arithmetic operation circuit 101 makes an affirmative decision in step S133 if SV=6 (the image-capturing sensitivity is equivalent to ISO 200) and ends the processing shown in FIG. 5 to proceed to step S3 in FIG. 2. Since the sensitivity is set to the lower limit of the sensitivity setting range under these circumstances, the setting processing ends without further lowering the sensitivity level. If, on the other hand, SV not=6, the arithmetic operation circuit 101 makes a negative decision in step S133 to proceed to step S134. In step S134, the arithmetic operation circuit 101 subtracts 1 from the image-capturing sensitivity SV and ends the processing shown in FIG. 5 to proceed to step S3 in FIG. 2. As a result, the image-capturing sensitivity is lowered by one stage.

Figure 6:
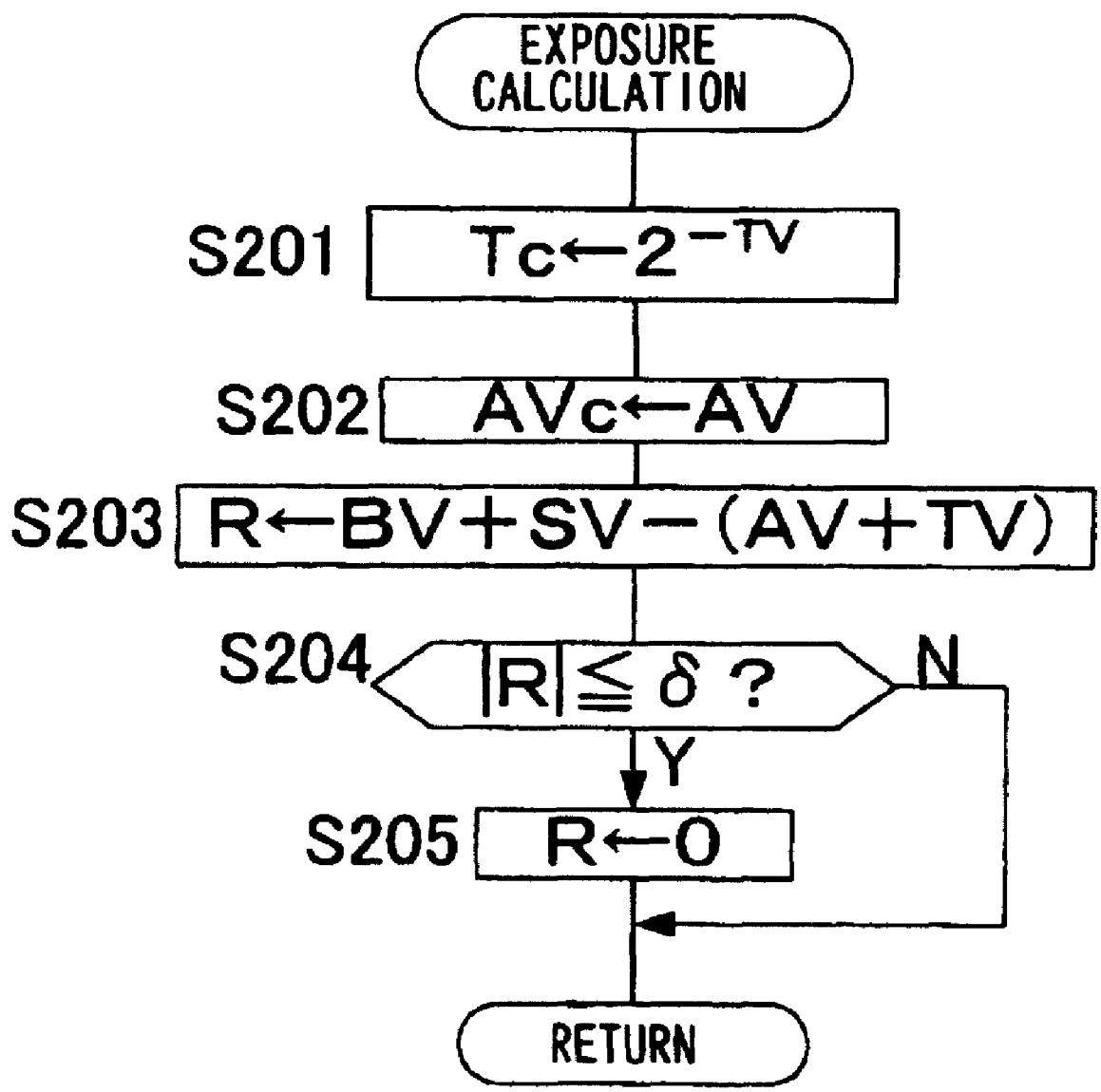
FIG. 6 presents a detailed flowchart of the exposure calculation processing.

The exposure calculation executed in step S4 in FIG. 2 is now explained in detail in reference to the flowchart presented in FIG. 6. In step S201, the arithmetic operation circuit 101 calculates the shutter speed time period Tc corresponding to the shutter speed TV through formula (3) presented below and then the operation proceeds to step S202.

$$Tc = 2^{-TV} \quad (3)$$

In step S202, the arithmetic operation circuit 101 sets the aperture value AV for the control aperture value AVc before the operation proceeds to step S203. In step S203, the arithmetic operation circuit 101 calculates an exposure deviation quantity R relative to the correct exposure by using formula (4) presented below, and then the operation proceeds to step S204.

$$R = BV + SV - (AV + TV) \quad (4)$$

In the expression presented above, BV represents the subject brightness, SV represents the image-capturing sensitivity. AV represents the aperture value and TV represents the shutter speed, and the correct exposure is achieved when (BV+SV)=(AV+TV) is true.

In step S204, the arithmetic operation circuit 101 makes a decision as to whether or not |R|=<δ is true. δ represents a predetermined specific value, which may be one of the APEX values ⅙ through ½. The arithmetic operation circuit 101 makes an affirmative decision in step S204 if |R|=<δ to proceed to step S205, whereas it makes a negative decision in step S204 if |R|=<δ is not true and ends the processing shown in FIG. 6 to proceed to step S5 in FIG. 2. An affirmative decision made in step S204 indicates that the correct exposure has been achieved, whereas a negative decision made in step S204 indicates that the correct exposure has not been achieved. In step S205, the arithmetic operation circuit 101 sets 0 for the exposure deviation quantity R and ends the processing shown in FIG. 6 to proceed to step S5 in FIG. 2.

Figure 7:
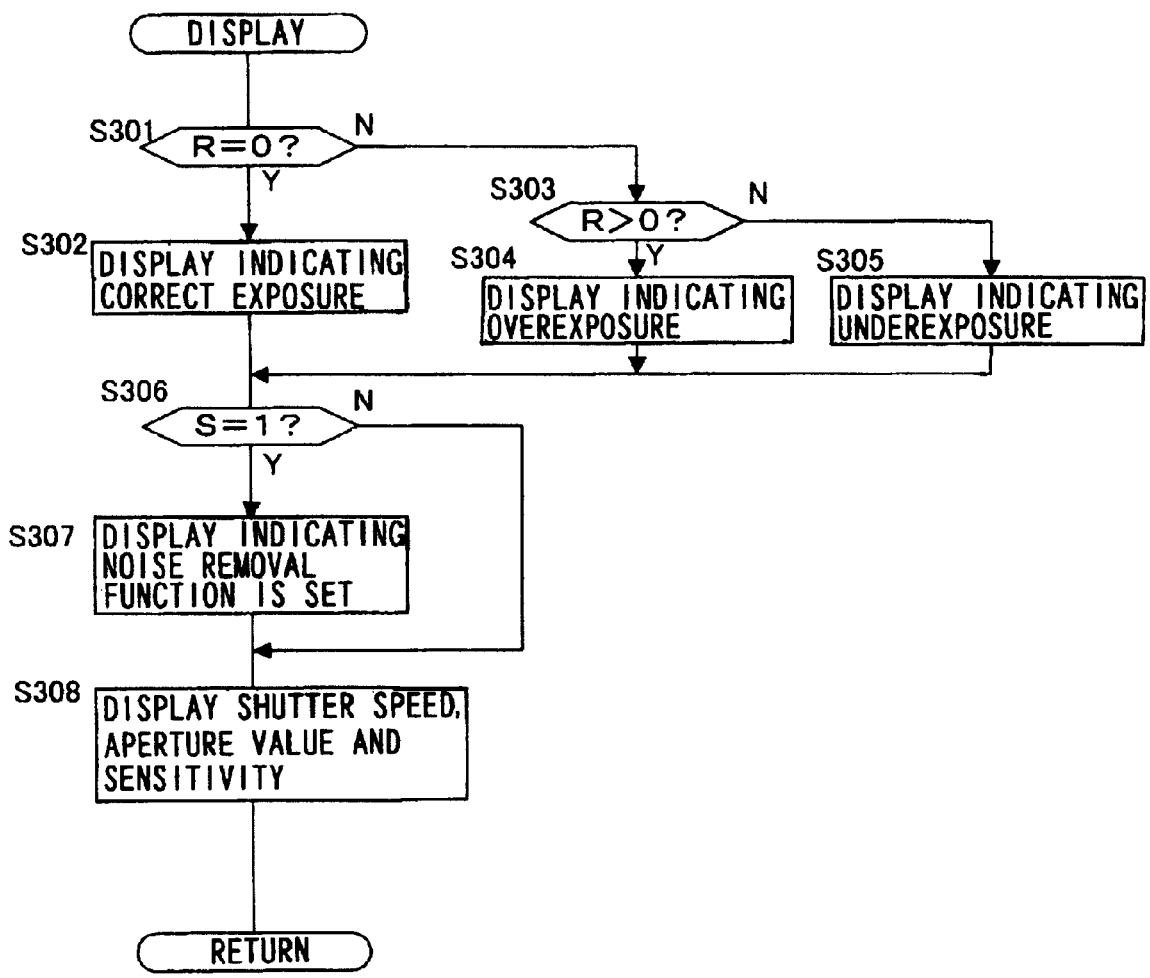
FIG. 7 presents a detailed flowchart of the display processing.

The display processing executed in step S5 in FIG. 2 is now explained in detail in reference to the flowchart presented in FIG. 7. In step S301, the arithmetic operation circuit 101 makes a decision as to whether or not the exposure deviation quantity R is 0. If R=0, the arithmetic operation circuit 101 makes an affirmative decision in step S301 to proceed to step S302, whereas if R not=0, the arithmetic operation circuit 101 makes a negative decision in step S301 to proceed to step S303. In step S302, the arithmetic operation circuit 101 engages the display device 112 to bring up a display indicating that the correct exposure has been achieved and then the operation proceeds to step S306.

In step S303, the arithmetic operation circuit 101 makes a decision as to whether or not R>0 is true. If R>0 (overexposure), the arithmetic operation circuit 101 makes an affirmative decision in step S303 to proceed to step S304. whereas if R<0 (underexposure), the arithmetic operation circuit 101 makes a negative decision in step S303 to proceed to step S305. In step S304, the arithmetic operation circuit 101 engages the display device 112 to bring up a display indicating overexposure and then the operation proceeds to step S306. In step S305, the arithmetic operation circuit 101 engages the display device 112 to bring up a display indicating underexposure and then the operation proceeds to step S306.

In step S306, the arithmetic operation circuit 101 makes a decision as to whether or not the flag S is set to 1. The arithmetic operation circuit 101 makes an affirmative decision in step 306 if S=1 (the noise removal setting is selected) to proceed to step S307, whereas it makes a negative decision in step S306 if S=0 (the noise removal setting has been cleared) to proceed to step S308. In step S307, the arithmetic operation circuit 101 engages the display device 112 to bring up a display indicating that the noise removal function has been set and then the operation proceeds to step S308. In step S308, the arithmetic operation circuit 101 engages the display device 112 to display the shutter speed TV, the aperture value AV and the image-capturing sensitivity SV and ends the processing shown in FIG. 7 to proceed to step S6 in FIG. 2. In response, the display device 112 displays the shutter speed value, the F value and the ISO equivalent value corresponding to the respective APEX values.

The following advantages are achieved in the electronic camera in the embodiment explained above.

(1) The upper limit TN is set for the image-capturing time period TB over which electrical charges are accumulated to obtain the fixed image data, when removing noise by subtracting the fixed image data resulting from an image-capturing operation performed over the image-capturing time period TB at the image-capturing element 102 while the subject light is blocked, from original image data resulting from an image-capturing operation performed over the image-capturing time period (charge storage time length TB) at the image-capturing element 102 while allowing the subject light to enter the image-capturing element 102. This upper limit TN represents the length of time over which electrical charges attributable to dark current can accumulate to the maximum extent without resulting in an overflow, and is set to assure the full dynamic range at the image-capturing element 102. Thus, the fixed pattern noise can be eliminated with a high degree of reliability and it is ensured that the wasteful charge storage operation ensuing from an overflow of stored charges attributable to dark current is not executed.

(2) The upper limit TN to the image-capturing time period is calculated by using expression (2) as a function of the image-capturing sensitivity SV set at the image-capturing element 102 and the temperature θ in the camera, and the temperature θ is ascertained based upon the voltage signal Vref, which is in proportion to the absolute temperature, output from the photometering device 108. Thus, since the charge storage time length upper limit TN can be adjusted even when the value of the dark current flowing through the image-capturing element 102 changes due to a change in the image-capturing sensitivity setting SV or a change in the temperature θ which reflects a change in the camera operating environment, the fixed pattern noise can be eliminated with a high degree of reliability and, furthermore, no wasteful charge storage operation is executed.

While the charge storage time length upper limit TN is calculated as a function of the temperature θ in the camera and the selected image-capturing sensitivity SV in the explanation above, the upper limit may instead be calculated as a function of either the temperature θ or the image-capturing sensitivity SV. For instance, formula (5) below may be used as a function of the temperature θ alone. This formula is obtained by using the image-capturing sensitivity SV=9 (equivalent to ISO 1600) corresponding to the highest dark current in the image-capturing sensitivity range SV 6 through SV 9 of the electronic camera for substitution in expression (2) presented earlier.

$$TN_{SV9} = 2^{-(\theta-32)/8} \times 3.75 \times 60 \quad (5)$$

Expression (5) above indicates that the maximum storage time length over which electrical charges attributable to dark current can be stored without an overflow when θ=32 degrees C. is 3.75 min.

Expression (6) below represents an example in which the charge storage time length upper limit TN is calculated as a function of the image-capturing sensitivity SV alone. This formula is obtained by using a temperature value 40 degrees C. corresponding to the highest dark current in the temperature range 0 degree C. through 40 degrees C. set in the electronic camera specifications for substitution in expression (2).

$$TN_{40 degrees\ C.} = 2^{(7-SV)} \times 7.5 \times 60 \quad (6)$$

Expression (6) above indicates that the maximum storage time period over which electrical charges attributable to dark current can be stored without an overflow when the image-capturing sensitivity is 7 (equivalent to ISO 400) is 7.5 min.

As described above, when calculating the charge storage time length upper limit TN as a function of the temperature θ alone, the image-capturing sensitivity SV is fixed at an arbitrary value (SV=9 in the example presented above) as in expression (5). This arbitrary value should be selected as appropriate from the image sensitivity range within which the image-capturing sensitivity of the electronic camera can be set, in correspondence to the actual operating conditions. If the upper limit is a calculated at the image-capturing sensitivity level corresponding to the highest dark current, as in expression (5) above, no overflow of stored charges attributable to the dark current occurs even if the image-capturing sensitivity setting is changed.

Alternatively, when the charge storage time length upper limit TN is calculated as a function of the image-capturing sensitivity alone, the temperature θ is fixed at an arbitrary value (40 degrees C. in the example) as in expression (6). The arbitrary value should be selected as appropriate within the temperature range 0 degree C. through 40 degrees C. stipulated in the electronic camera specifications in correspondence to the actual operating temperature. When the upper limit is calculated at the temperature corresponding to the highest dark current as in expression (6), no overflow of stored charges attributable to the dark current occurs even if the operating temperature changes.

Furthermore, the charge storage time length upper limit TN may be set as a fixed value instead of as a function. Expression (7) is obtained by using an image-capturing sensitivity value SV of 7 and a temperature value of 24 degrees C. for substitution in expression (2).

$$TN_{SV7,24\ degrees\ C.} = 30 \times 60 \quad (7)$$

The value of the temperature θ can be selected as appropriate in correspondence to the actual operating temperature of the electronic camera and the value of the image-capturing sensitivity SV can be selected as appropriate in correspondence to the operating conditions under which the electronic camera is operated.

While an explanation is given above on an example in which the present invention is adopted in a single lens reflex electronic camera, the present invention may also be adopted in an electronic camera that is not a single lens reflex type camera. Namely, the present invention may be adopted in any camera as long as it employs an image-capturing element and is capable of measuring dark current.

While the voltage signal Vref which is in proportion to the absolute temperature output from the photometering device 108 is used to detect the temperature inside the camera in the explanation provided above, the temperature may instead be detected by utilizing a thermistor or the like functioning as a temperature detection element.

The above described embodiment is an example and various modifications can be made without departing from the spirit and scope of the invention.

What is claimed is:

1. An electronic camera, comprising:
   an image-capturing element that outputs image-capturing signals;
   a shutter device that allows subject light to pass through to the image-capturing element or shields the image-capturing element from the subject light;
   an image-capturing circuit that engages the image-capturing element in an image-capturing operation over a first length of time to output a first image-capturing signal while the subject light is allowed to pass through to the image-capturing element and also engages the image-capturing element in an image-capturing operation over a second length of time to output a second image-capturing signal while the image-capturing element is shielded from the subject light;
a signal correction circuit that executes a signal correction by subtracting the second image-capturing signal from the first image-capturing signal; and
a control circuit that sets an upper limit to the second length of time of the image-capturing operation, based upon a temperature and a sensitivity of the image-capturing element, and that controls the image-capturing element so that the second length of time of the image-capturing operation executed while the image-capturing element is shielded from the subject light does not exceed the upper limit.

2. An electronic camera according to claim 1, wherein:
the control circuit determines the upper limit based upon a setting range of image-capturing sensitivity of the image-capturing element and an operating temperature range of the camera.

3. An electronic camera according to claim 1, wherein:
the control circuit determines the upper limit by using a function of image-capturing sensitivity of the image-capturing element and sets the function at an operating temperature level within an operating temperature range of the electronic camera, at which a dark current is at a highest level.

4. An electronic camera according to claim 1, wherein: the signal correction circuit executes the signal correction by subtracting the second image-capturing signal from the first image-capturing signal for each of pixels constituting the image-capturing element.

5. An electronic camera according to claim 1, wherein:
the control circuit sets the upper limit after the image-capturing circuit engages the image-capturing element in the image-capturing operation over the first length of time to output the first image-capturing signal while the subject light is allowed to pass through to the image-capturing element.

6. An electronic camera according to claim 1, wherein:
the control circuit determines the upper limit by setting the temperature to a fixed value within an operating temperature range of the camera.

7. An electronic camera according to claim 6, wherein:
the control circuit determines the upper limit by setting the sensitivity to a fixed value.

8. An electronic camera according to claim 1, wherein:
the image-capturing circuit engages the image-capturing element in an image-capturing operation over the second length of time to output the second image-capturing signal when the second length of time does not exceed the upper limit and engages the image-capturing element in an image-capturing operation over a length of time of the upper limit to output the second image-capturing signal when the second length of time exceeds the upper limit.

9. An electronic camera, comprising:
an image-capturing element that outputs image-capturing signals;
a shutter device that allows subject light to pass through to the image-capturing element or shields the image-capturing element from the subject light;
an image-capturing circuit that engages the image-capturing element in an image-capturing operation over a first length of time to output a first image-capturing signal while the subject light is allowed to pass through to the image-capturing element and also engages the image-capturing element in an image-capturing operation over a second length of time to output a second image-capturing signal while the image-capturing element is shielded from the subject light;
a signal correction circuit that executes a signal correction by subtracting the second image-capturing signal from the first image-capturing signal; and
a control circuit that sets an upper limit to the second length of time of the image-capturing operation, based upon characteristics of the image-capturing element, and that controls the image-capturing element so that the second length of time of the image-capturing operation executed while the image-capturing element is shielded from the subject light does not exceed the upper limit; and
a temperature detection element that detects a temperature inside the camera, wherein:
the control circuit determines the upper limit based upon the temperature detected by the temperature detection element.

10. An electronic camera according to claim 9, wherein:
the control circuit determines the upper limit based upon the temperature detected by the temperature detection element and image-capturing sensitivity of the image-capturing element.

11. An electronic camera according to claim 9, wherein:
the control circuit determines the upper limit by using a function in which at least either the temperature detected by the temperature detection element or image-capturing sensitivity of the image-capturing element is a variable.

12. An electronic camera according to claim 9, wherein:
the control circuit determines the upper limit by using a function of the temperature detected by the temperature detection element and sets the function at an image-capturing sensitivity level within a setting range of image-capturing sensitivity of the image-capturing element, at which a dark current is at a highest level.

13. An electronic camera, comprising:
an image-capturing element that outputs image-capturing signals;
a shutter device that allows subject light to pass through to the image-capturing element or shields the image-capturing element from the subject light;
an image-capturing circuit that engages the image-capturing element in an image-capturing operation over a first length of time to output a first image-capturing signal while the subject light is allowed to pass through to the image-capturing element and also engages the image-capturing element in an image-capturing operation over a second length of time to output a second image-capturing signal while the image-capturing element is shielded from the subject light;
a signal correction circuit that executes a signal correction by subtracting the second image-capturing signal from the first image-capturing signal; and
a control circuit that sets an upper limit to the second length of time of the image-capturing operation, so that the second image-capturing signal output from the image-capturing element does not exceed an output saturation level of the image-capturing element, and that controls the image-capturing element so that the second length of time of the image-capturing operation executed while the image-capturing element is shielded from the subject light does not exceed the upper limit.

* * * * *